United States Patent
Goodman et al.

(10) Patent No.: US 7,430,684 B2
(45) Date of Patent: Sep. 30, 2008

(54) METHOD TO USE FABRIC INITIALIZATION TO TEST FUNCTIONALITY OF ALL INTER-CHIP PATHS BETWEEN PROCESSORS IN SYSTEM

(75) Inventors: Benjiman Lee Goodman, Cedar Park, TX (US); Paul Frank Lecocq, Cedar Park, TX (US); Praveen S. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 11/054,275

(22) Filed: Feb. 9, 2005

(65) Prior Publication Data
US 2006/0179356 A1 Aug. 10, 2006

(51) Int. Cl.
*G06F 11/00* (2006.01)
(52) U.S. Cl. .............................. 714/4; 714/43; 370/242
(58) Field of Classification Search .................... 714/4, 714/43; 370/242, 248
See application file for complete search history.

(56) References Cited

U.S. PATENT DOCUMENTS

| | | | | |
|---|---|---|---|---|
| 6,092,220 A | * | 7/2000 | Palmer et al. | 714/43 |
| 6,665,811 B1 | * | 12/2003 | de Azevedo et al. | 714/4 |
| 6,880,100 B2 | * | 4/2005 | Mora et al. | 714/4 |
| 6,885,644 B1 | * | 4/2005 | Knop et al. | 370/254 |
| 7,168,011 B2 | * | 1/2007 | Spies et al. | 714/43 |
| 2006/0104210 A1 | * | 5/2006 | Nielsen | 370/248 |

* cited by examiner

*Primary Examiner*—Marc Duncan
(74) *Attorney, Agent, or Firm*—Duke W. Yee; Diana R. Gerhardt; Houda El-Jarrah

(57) ABSTRACT

A method, apparatus, and program for systematically testing the functionality of all connections in a multi-tiered bus system that connects a large number of processors. Each bus controller is instructed to send a test version of a snoop request to all of the other processors and to wait for the replies. If a connection is bad, the port associated with that connection will time out. Detection of a time-out will cause the initialization process to be halted until the problem can be isolated and resolved.

6 Claims, 5 Drawing Sheets

METHOD TO USE FABRIC INITIALIZATION TO TEST FUNCTIONALITY OF ALL INTER-CHIP PATHS BETWEEN PROCESSORS IN SYSTEM

BACKGROUND OF THE INVENTION

1. Technical Field

The present invention generally relates to a method, apparatus, and computer program for a testing protocol in a computer system. More specifically, the invention relates to testing the functionality of the connections in a system having a large number of multiprocessors connected by fabric bus.

2. Description of Related Art

Large multiprocessing systems are commonly formed of interconnected systems of processors, associated caches, and communication devices, which must maintain coherency of information being processed by the system. These multiprocessing systems often utilize a bus-snooping protocol in which all caches monitor (or snoop) the bus to determine if they have a copy of a block of data that is being requested. Every cache has a copy of the sharing status of every block of physical memory it has. Multiple copies of a document can be read without any coherence problems; however, a processor must have exclusive access in order to write. When a processor wishes to write data, that processor will send specific messages to the other processors, depending on the protocol used. These messages can cause copies of the data in the caches of all other processors in the system to be rendered invalid, or else the messages broadcast the new data over the bus, causing the other caches that contain copies of the data to be updated.

In past systems, multiprocessors have generally been connected in a ring structure, such as that shown in FIG. 1. This figure shows a multiprocessing system 100 containing eight processing units 102-116. Each processing unit is directly connected only to the two processing units on either side of it in the ring, so that processing unit 102 is directly connected to processing units 104 and 116; processing unit 104 is connected to processing units 102 and 106; etc. In such a system, a snooping request will be passed from one processing unit to another around the ring, so that by the time it returns to the originating processing unit, it is clear that every processing unit in the system has been contacted. As the number of processing unit increases, however, such a process becomes too lengthy to be practical, so that new types of interconnections have evolved. One such type of interconnection is called a multi-tier bus or fabric bus. In a fabric bus system, each bus connects only two processing units, but each processing unit may be connected to a number of other processing units by separate busses. In such a system, the number of connections themselves becomes very large. Additionally, a single bad connection between two processors is significant, because it can allow data coherence to fail. However, the problem is not easily determined, since there is no single path between processing units that will test all connections. It would be desirable to have a system and method that can determine that all connections are operating correctly.

SUMMARY OF THE INVENTION

The invention provides a method, apparatus, and program for systematically testing the functionality of all connections in a multi-tiered bus system that connects a large number of processors. At initialization or when processors are added or replaced, each bus controller is instructed to send a test version of a snoop request to all of the other processors and to wait for the replies. If a connection is bad, the port associated with that connection will time out. Detection of a time-out will cause the initialization process to be halted until the problem can be isolated and resolved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

An embodiment of the invention will now be discussed with reference to the figures. This exemplary embodiment shows a processing system containing 64 processors connected by fabric bus, although the number of processors is not a limiting factor in the use of this invention.

Figure 1:
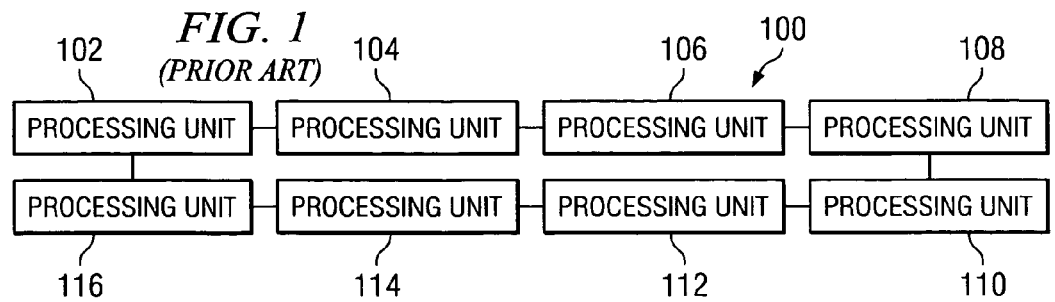
FIG. 1 shows the connectivity of a simple ring structure of the prior art.
Figure 2:
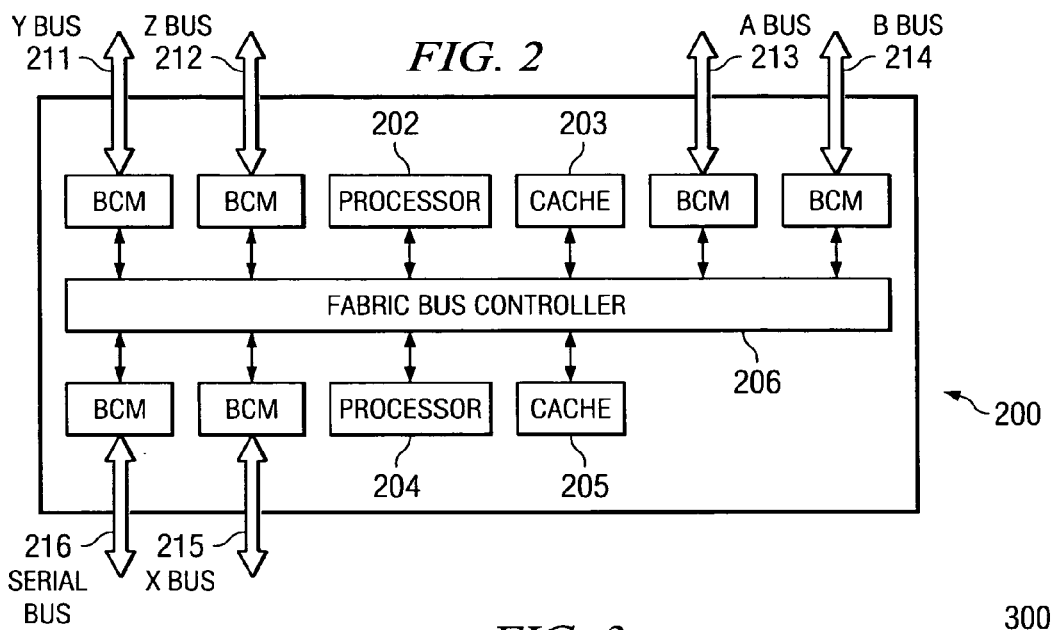
FIG. 2 shows a high-level diagram of a fabric bus controller (FBC) chip that can be used to implement the inventive method, according to an exemplary embodiment of the invention.

With reference to FIG. 2, a high-level diagram of a chip 200 used in the multi-processing system is shown, according to an embodiment of the invention. Chip 200 contains two processors 202, 204 with their respective cache memories 203, 205 and fabric bus controller 206, which contains the modules necessary to communicate over the bus, manage arbitration, snooping, etc. Other devices are connected to the fabric bus controller, but are not shown, as their presence is peripheral to the invention. Each chip also contains six bus connection modules BCM, as shown. Bus connections A 214, B 215, X 215, Y 211, and z 212 provide connections between chip 200 and similar chips; remaining bus 216 is a serial bus used for initializing the multiprocessor system.

Figure 3:
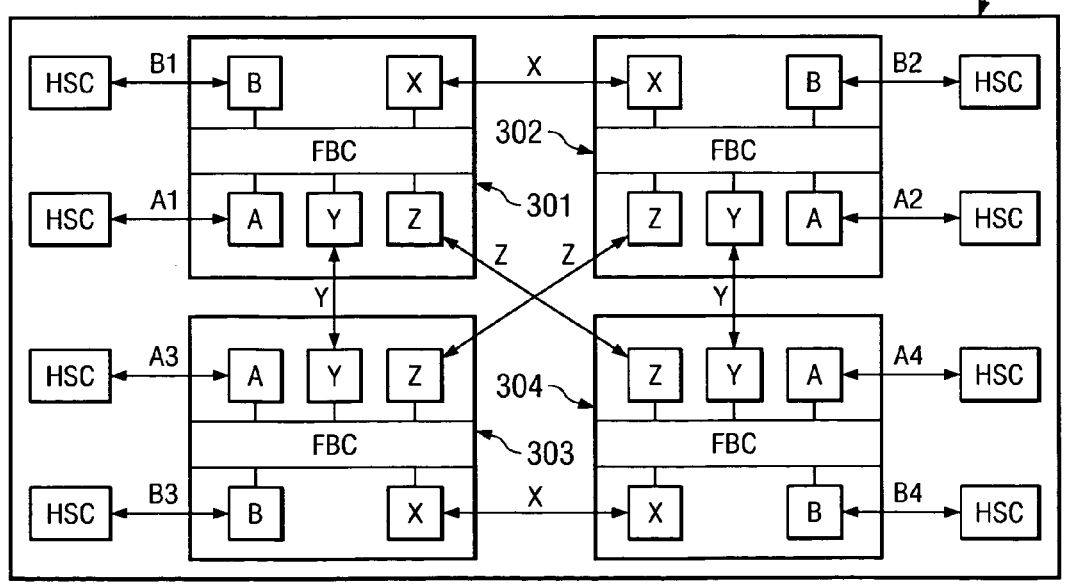
FIG. 3 shows a card containing four of the FBC chips of FIG. 2, which can be used to form a node of an array of bus controllers that provide connectivity for a large number of processors, according to an exemplary embodiment of the invention.

With reference now to FIG. 3, a multi-chip card 300 is shown, containing four chips 301, 302, 303, 304 and their connections. Each card 300 will be used to form a node in an array of processors. Each of chips 301, 302, 303, 304 is identical to chip 200 shown in FIG. 2. In this embodiment, bus connections X, Y, Z form the intra-card connections, while bus connections A, B form the inter-card connections. Thus, chips 301, 302 are connected together by their respective X bus connections, as are chips 303, 304. Chips 301 and 303 are connected by their respective Y bus connections, as are chips 302 and 304. Finally, chips 301 and 304 are connected by their respective Z bus connections, as are chips 302 and 303. The X, Y, and Z busses are designed to have the same latency across all three for synchronization purposes, although this is not strictly necessary. The A and B busses for each of chips 301, 302, 303, 304 are connected to respective chips HSC, which manage high-speed communications between different nodes. Thus, there are eight busses A1, B1, A2, B2, A3, B3, A4, B4 for inter-card communications.

Figure 4:
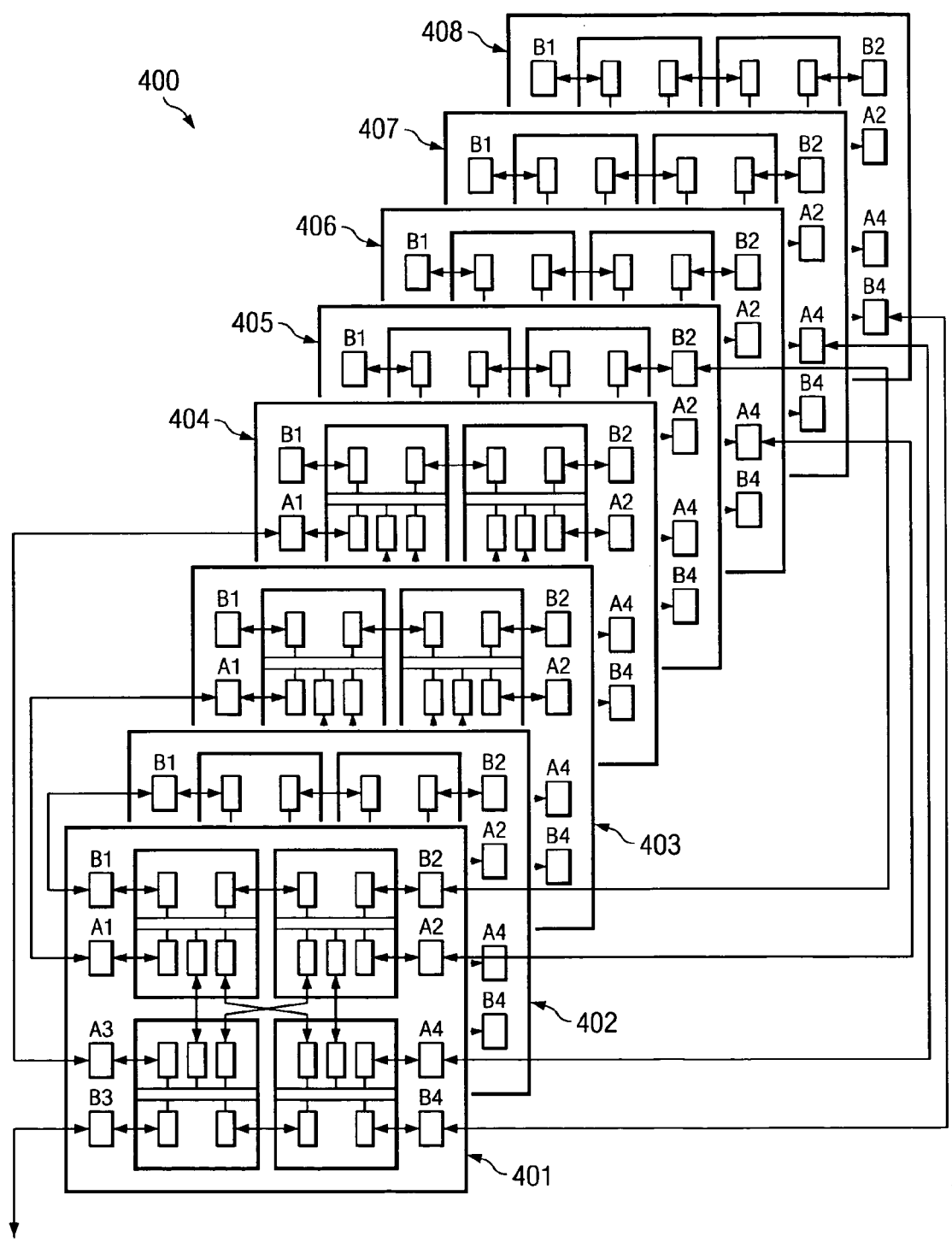
FIG. 4 demonstrates the connectivity of a single node of the array of bus controllers to the other nodes, according to an exemplary embodiment of the invention.

With reference now to FIG. 4, a set 400 of eight cards 401-408 are shown. Each of cards 401-408 is identical to multi-chip card 300. Only the connections for card 401 are shown in this drawing, although the other connections are similar. The connections are as follows:

| | |
|---|---|
| 401.A1 - 403.A1 | 401.B1 - 402.B1 |
| 401.A2 - 406.A4 | 401.B2 - 405.B2 |
| 401.A3 - 404.A1 | 401.B3 - RESEVED |
| 401.A4 - 407.A4 | 401.B4 - 408.B4 |

In this manner, seven of the A, B bus connectors on node 401 are used to connect to a processor on one of the seven other nodes 402-408; the eighth connection is reserved for expansion.

Figure 5:
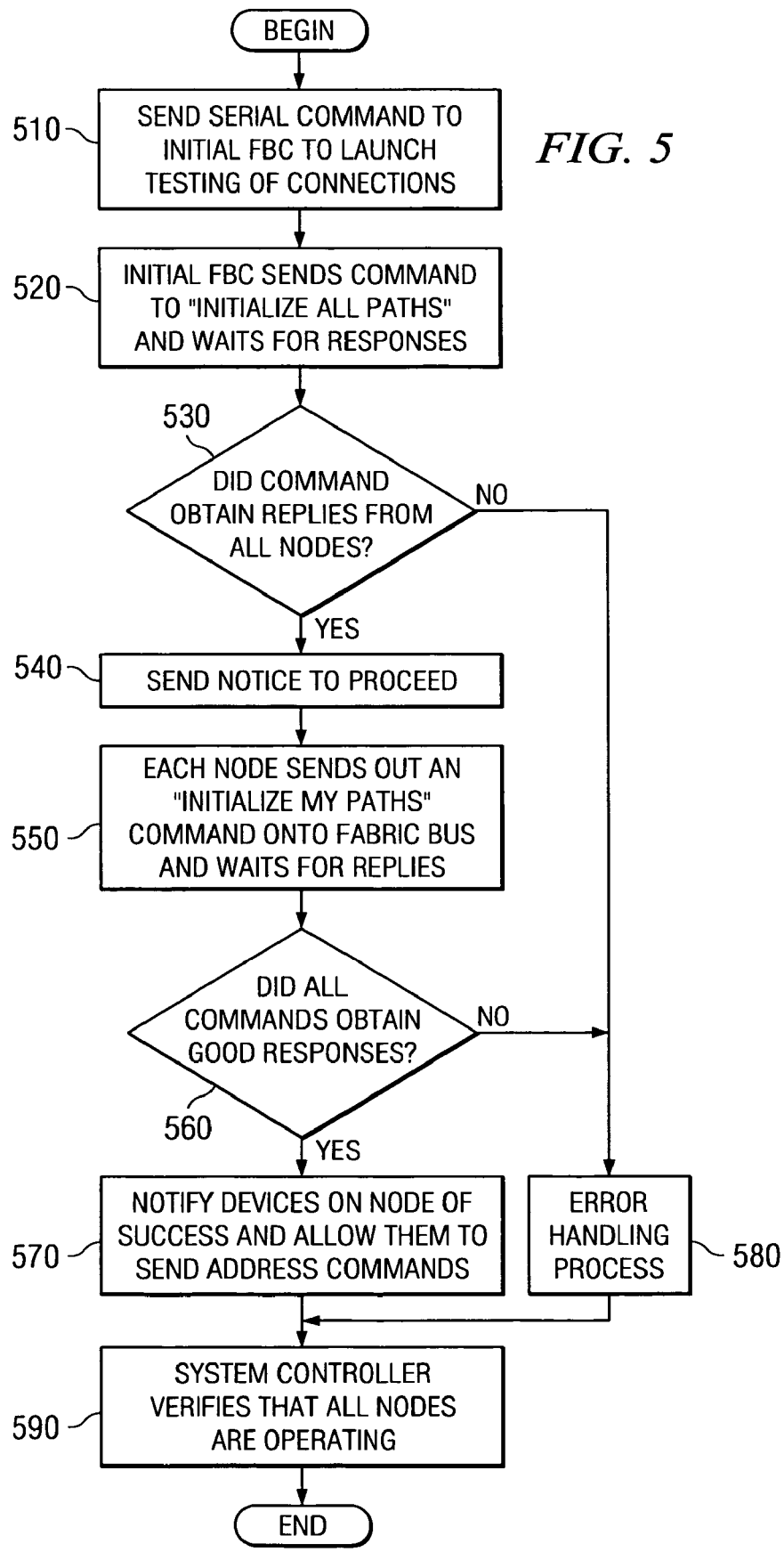
FIG. 5 demonstrates a flowchart of a method of testing the fabric bus connections for the system of FIG. 4, according to an exemplary embodiment of the invention.

It is necessary to ensure that communication among all these processors is enabled, so that coherency is maintained between the multiple cache memories and external memories. The process of testing the connections is stored and initiated in firmware in a system controller that is external to the system shown. Once initiated, the fabric bus controllers 206 present on each chip provide the testing procedures. This testing can also be invoked when modifications to the system are performed, such as replacing a processor. With reference now to FIG. 5, a method for testing the connections is disclosed. As the process is discussed, FIGS. 6A-6D help provide a visualization of the process by showing the fabric bus controllers (FBC) in the system and the activity concerning them. In these figures, the system is shown as nodes 601-608 having connections between each pair of nodes. The fabric bus controllers 206 are shown as squares labeled A, B, C, D within each of nodes 601-608. When an FBC receives a message, it will be shown in the figures as a darkened box, while the same box will appear as a lightly shaded box if the FBC is sending a message and as a white box if the FBC is waiting.

Figure 6A:
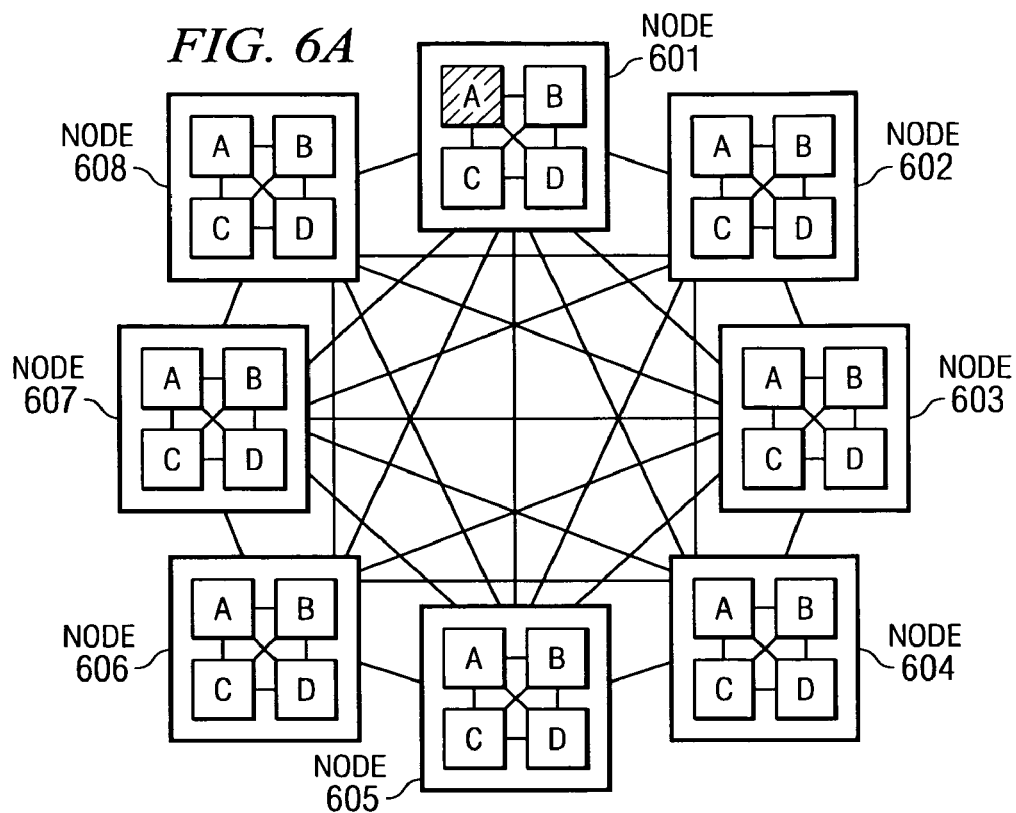
FIGS. 6A-D visually show the flow of messages throughout the array of bus controllers, each of which provides connectivity for one or more processors, according to an exemplary embodiment of the invention.

The process in FIG. 5 begins with the system controller sending a command to one of the controllers in the array to launch the testing (step 510). This command is sent using the serial bus connection 216, which was shown in the description of the chip. Although the connection was not specifically shown in the chip or system diagrams, this bus provides a means for the system controller to communicate with the bus controllers on the various chips. The specific FBC to which the message is sent can be determined by any method, since all connections must be checked; however, for the sake of discussion, we can refer to FBC A on node 601, also referred to as 601-A, as having received the message. FIG. 6A shows the system, with only FBC 601-A darkened to indicate that it has received a message. After the initial command is received, the FBC, e.g., 601-A sends out a command to "Initialize all Paths" (step 520).

Figure 6B:
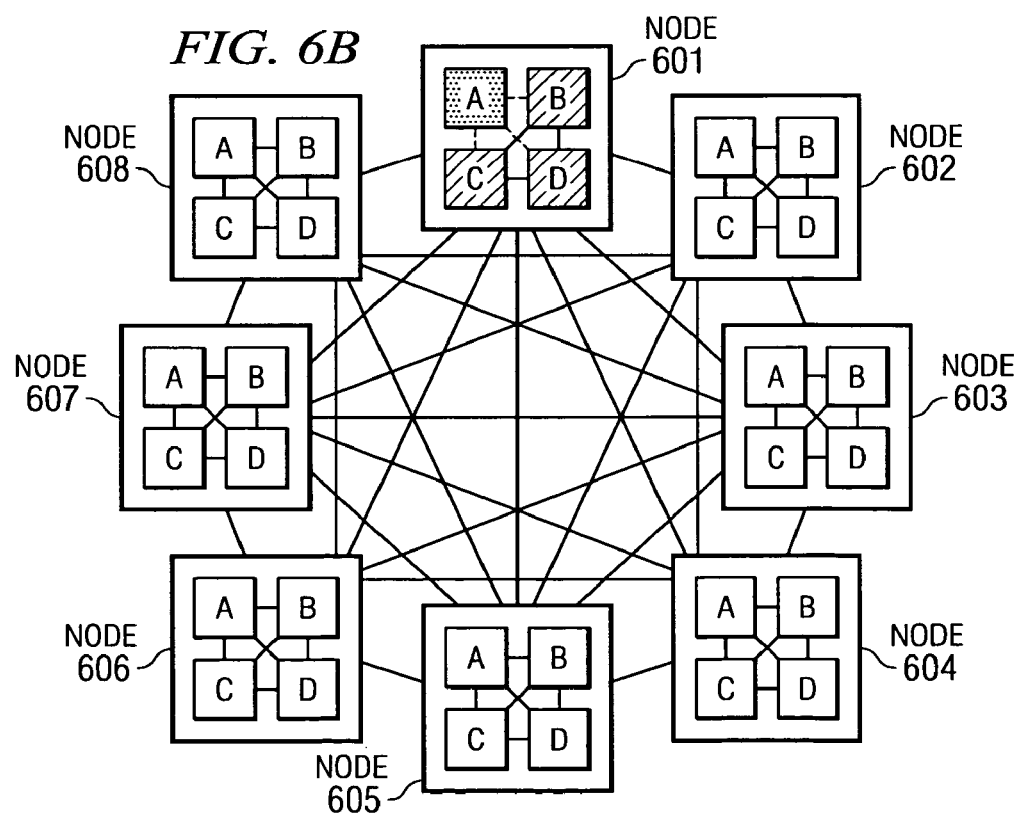

The "Initialize all Paths" command is first propagated to FBCs 601-B, 601-C, 601-D, which form the first tier out from 601-A, through the X, Y, Z busses, as shown in FIG. 6B. The active busses are dotted in this figure to show their activity.

Figure 6C:
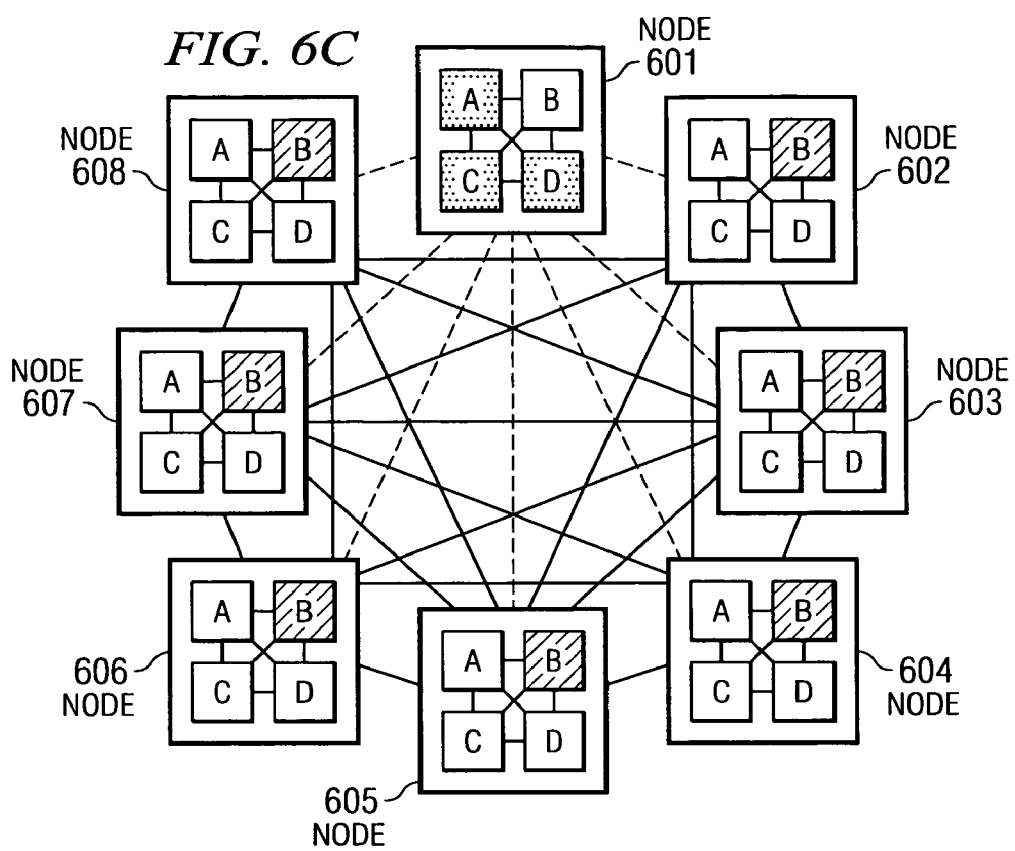
Figure 6D:
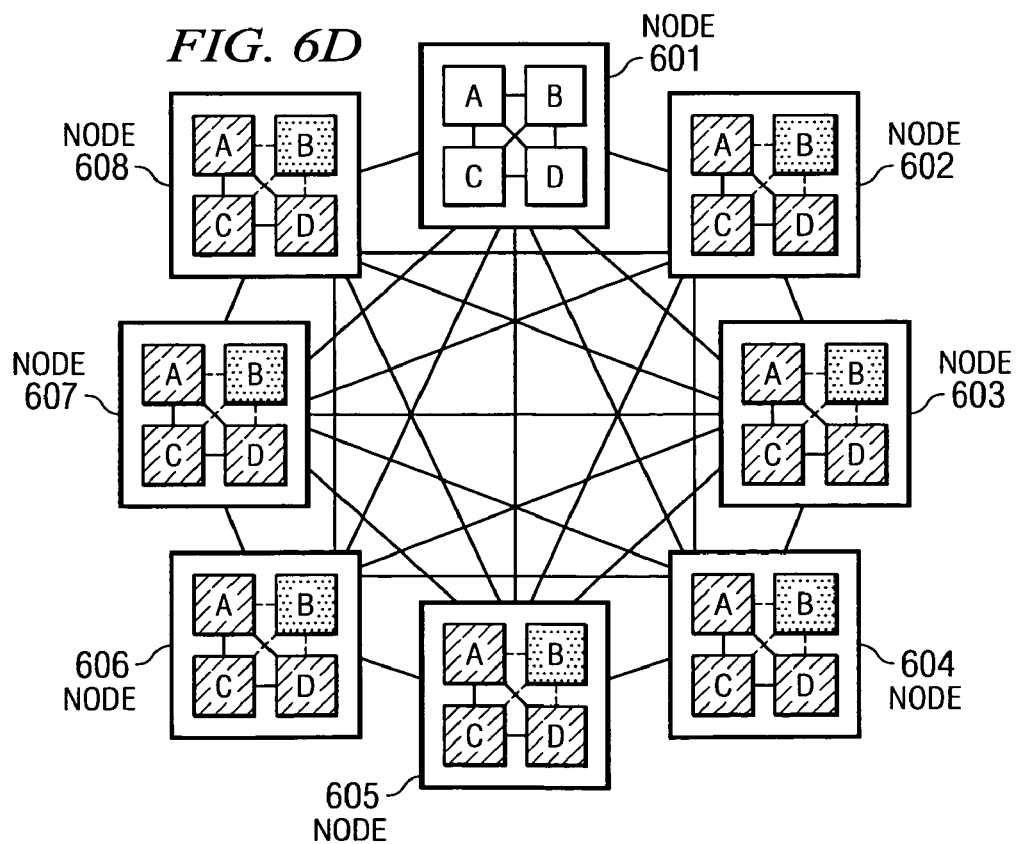

Next, FBCs 601-B, 601-C, 601-D forward the "Initialize all Paths" command to the next tier of FBCs, consisting in this example of FBCs 602-B, 603-B, 604-B, 605-B, 606-B, 607-B, 608-B, as shown in FIG. 6C. Then, FBCs 602-B, 603-B, 604-B, 605-B, 606-B, 607-B, 608-B propagate the message to the A, C, D FBCs on their respective nodes, as shown in FIG. 6D. If all connections are working correctly, then at this point in time, the initial message has propagated to all of the fabric bus controllers in the system. Now, the FBCs must respond, which confirms receipt of the message. This is done by reversing the process shown in FIGS. 6B through 6D, so that the A, C, D controllers of nodes 602, 603, 604, 605, 606, 607, 608 send confirmations to their respective B controllers; the B controllers will collect these confirmations then send a response showing the accumulated confirmations of receipt for their node. The responses are sent to each node's respective connection on node 601. Once the B, C, D controllers on node 601 have received responses from each node they contacted, controllers 601-B, 601-C, 601-D send the accumulated confirmations in a response to controller 601-A.

Controller 601-A waits until it has received all of the expected responses. At a time when the process should be complete, controller 601-A determines whether or not the command obtained confirming responses from all FBCs (step 530). Since each controller does not respond until it has received all expected incoming responses, an error will cause a time-out on one or more controllers. If a time-out was received from any of the fabric bus controllers, the process moves to an error handling process (step 580). If acknowledgement responses are received from all of the controllers, then one subset of the inter-nodal busses have been tested; at this point, controller 601-A will send a message to all controllers, using the same communications mechanism as was discussed, giving the accumulated responses, which also is the signal to proceed in the method (step 540). When the FBCs on nodes 602-608 receive this message, they know that the rest of their own bus connections must be tested.

One controller on each of nodes 602-608, e.g., the A controller, will then perform a test of their own subset of busses, sending out messages and waiting for replies (step 550). There is no particular order in which the nodes will run their tests, but it will be obvious to one of ordinary skill that the various nodes will negotiate with each other in assigning priorities for communications, just as they will negotiate when the bus is fully functional. The A controller or designated controller on each node determines separately whether all of their commands received replies (step 560). If they did, the designated controller on that node will notify the other controllers on that node that the connections are operational and allow them to send address commands on the fabric bus (step 570); otherwise control is passed to the error handling process (step 580). Since the various FBCs are acting independently, the system controller can, as a backup measure, verify that all nodes are operating correctly (step 590).

The error handling process of step 580 can be configured in several ways. In one embodiment, invoking the error process halts the process of bringing up the fabric bus until corrections can be made. The process then determines which node and what bus associated with that node called the error routine. Corrective action is then performed, including notification of system personnel. Once corrective action has been taken, the bus can resume initialization. In another embodiment, if most of the nodes are operating correctly but at least one connection is not functioning correctly, the error process can isolate the problem area(s) from the rest of the system. In this manner, the system can initialize and perform its functions, but with somewhat lowered efficiency until all connections can be brought online.

As disclosed, the inventive process provides a simple, easy method for ensuring that all connections are functioning correctly on a large, complex set of processors working in tandem.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. In particular, although the system on which this was demonstrated uses a bus snooping protocol for data coherency, the inventive method can also be used on system the run under a different protocol, such as a directory based protocol.

What is claimed is:

1. A method for testing connections in a multi-tier bus system, the method comprising the steps of:

organizing the system as a plurality of bus controllers, each designated as controller (x,y), wherein x, y, m, and n are integers, x designates a node, y designates a controller within the node, m is the number of nodes within the system, and n is the number of bus controllers in a node, wherein every controller on a given node is connected to every other controller on said given node and every controller on said given node is connected to at least one controller on a different node; from controller (1,1), sending a first message to controller (1,2), (1,3), (1,n), each of which forwards said first message to a respective controller on another node, wherein each said respective controller on another node forwards said first message to all other controllers on its respective node;

from each controller that receives said first message, sending a first acknowledgement of receipt, wherein each controller that forwarded said first message to another controller waits for said first acknowledgement of receipt from said another controller and sends a cumulative acknowledgement; if controller (1,1) receives respective cumulative acknowledgements from controllers (1,2), (1,3), . . . (1,n) within an expected time limit, sending a total-cumulative acknowledgement message.

2. The method of claim 1, wherein a system controller initiates said method by sending said first message to controller (1,1).

3. The method of claim 1, further comprising the steps of: on receipt of said total cumulative acknowledgement message by controller (w,1) where w is between 1 and m, sending a second message to controller (w,2), (w,3), . . . (w,n), each of which sends said second message to a controller on another node, wherein each said respective controller on another node sends said second message to all other controllers on its respective node;

from each controller that receives said second message, sending a second acknowledgement of receipt, wherein each controller that forwarded said second message to another controller waits for said acknowledgement of receipt from said another controller and sends a second cumulative acknowledgement;

if controller (w,1) receives respective cumulative acknowledgements from controllers (w,2), (w,3), . . . (w,n) within an expected time limit, allowing node w to send address queries, else passing control to an error routine.

4. The method of claim 3, wherein if said controller (w,1) does not receive respective cumulative acknowledgements from controllers (w,2), (w,3), . . . (w,n) within an expected time limit, passing control to an error routine.

5. The method of claim 1, wherein if said controller (1,1) does not receive respective cumulative acknowledgements from controllers (1,2), (1,3), . . . (1,n) within an expected time limit, passing control to an error routine.

6. The method of claim 1, wherein each of said bus controllers provides bus access for one or more processors.

* * * * *